Patented Nov. 13, 1923.

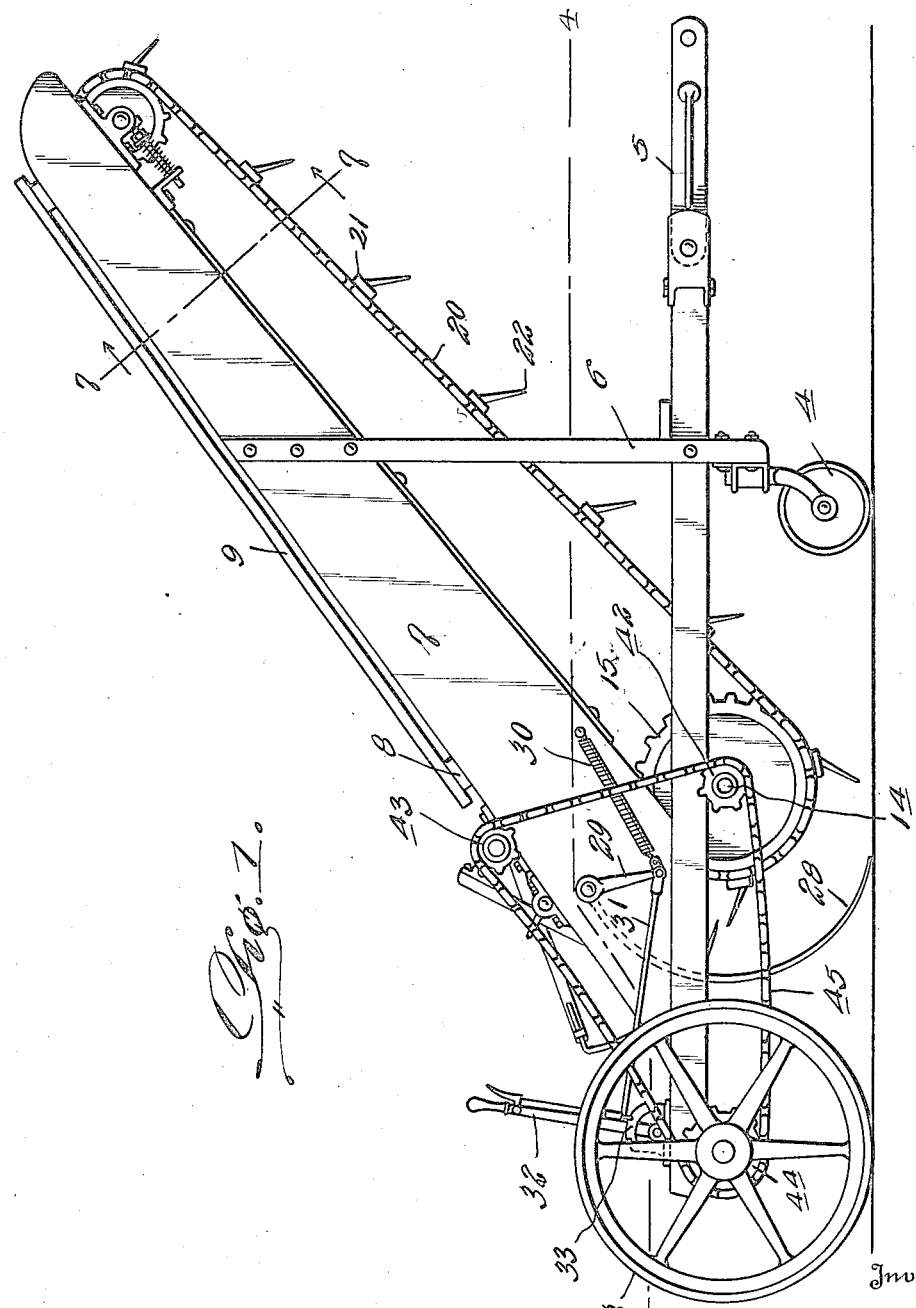

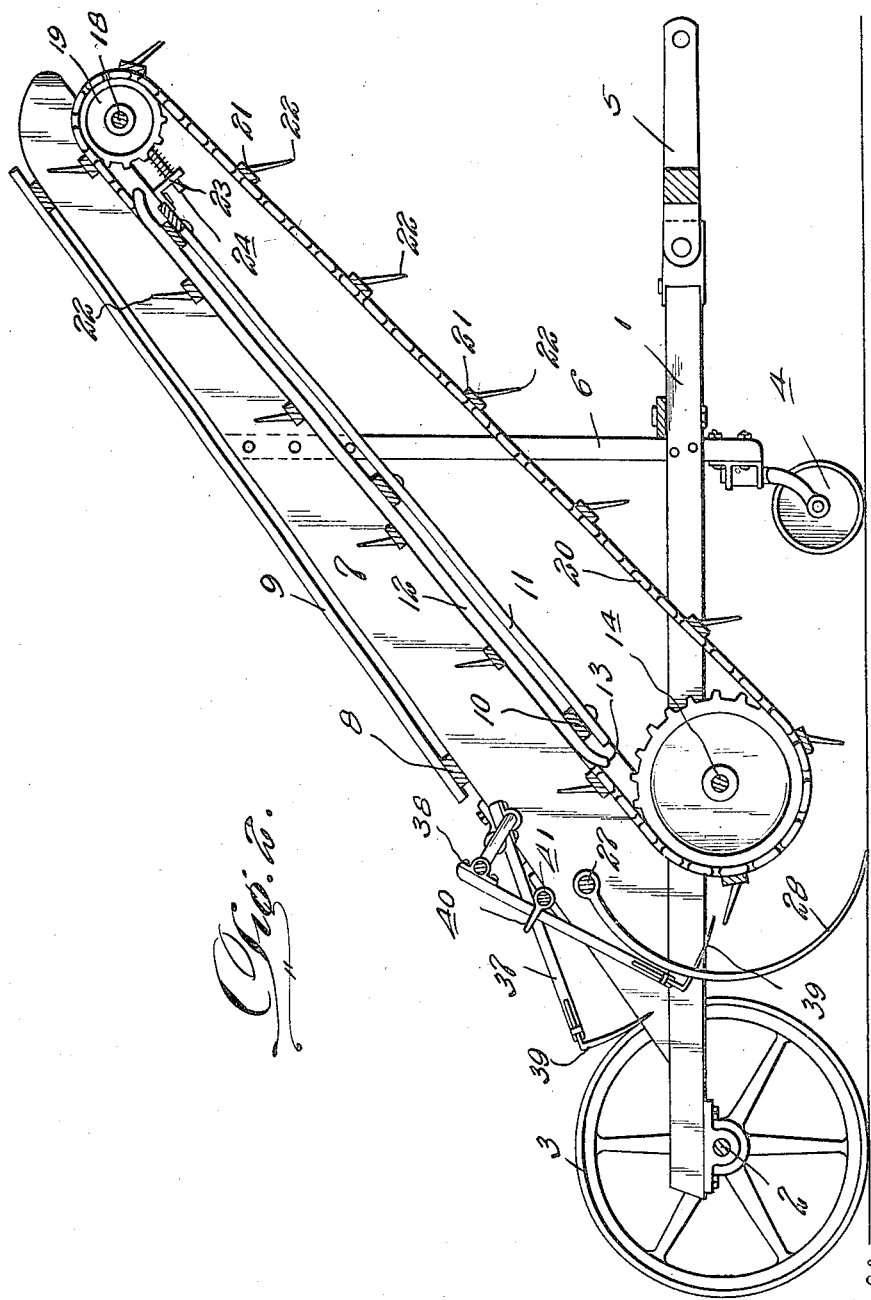

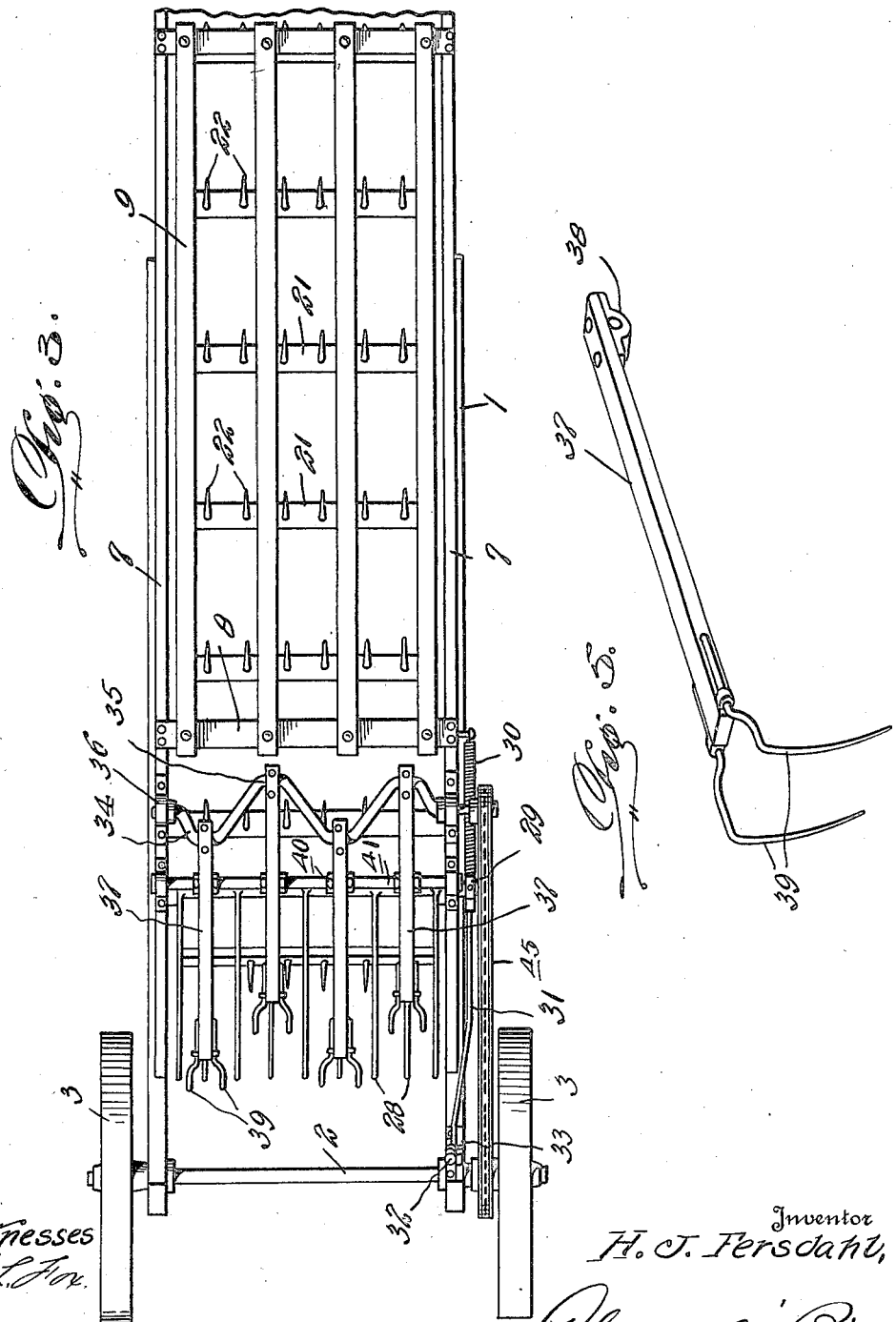

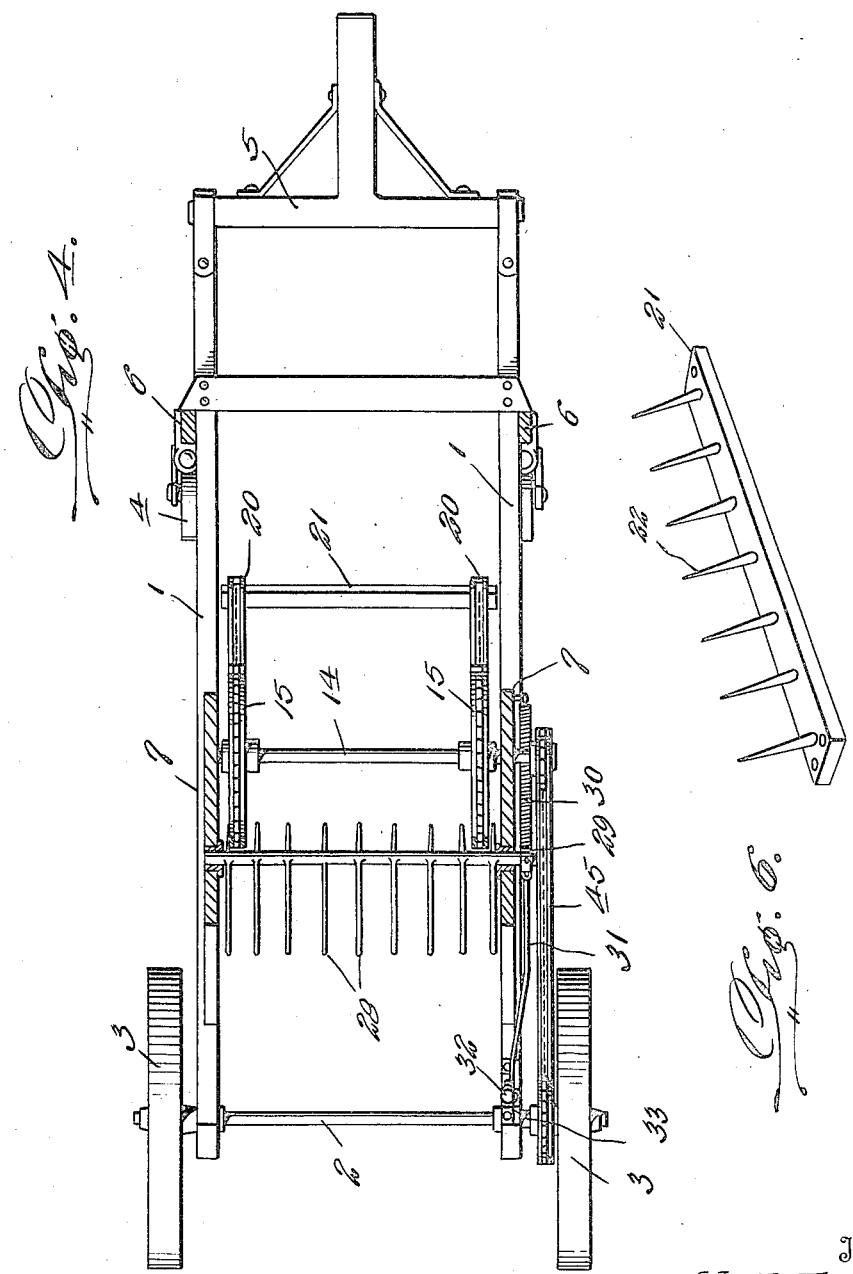

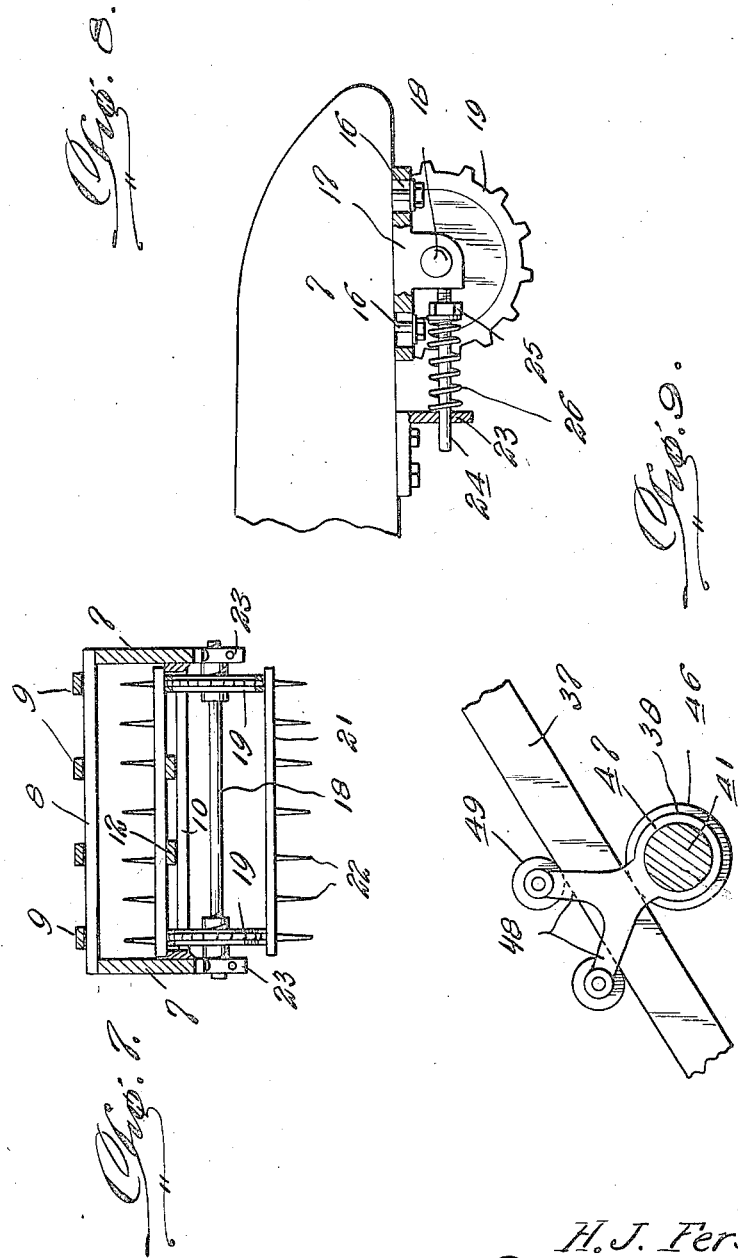

1,473,614

UNITED STATES PATENT OFFICE.

HENRY J. FERSDAHL, OF RENNER, SOUTH DAKOTA.

HAY LOADER.

Application filed May 16, 1922. Serial No. 561,440.

*To all whom it may concern:*

Be it known that I, HENRY J. FERSDAHL, a citizen of the United States, residing at Renner, in the county of Minnehaha and State of South Dakota, have invented new and useful Improvements in Hay Loaders, of which the following is a specification.

In carrying out the present invention it is my purpose to improve and simplify the general construction of hay loaders and to provide a hay loader which will embody comparatively few parts and these so arranged and corelated as to reduce the possibility of derangement to a minimum.

It is also my purpose to provide a hay loader wherein all of the essential parts of the loader will be readily accessible so as to facilitate the replacement or repair of such parts.

With the above recited objects in view, and others of a like nature, the invention resides in the construction, combination and arrangement of parts set forth in and falling within the scope of the appended claim.

In the accompanying drawings:

Figure 1 is a view in side elevation of a hay loader constructed in accordance with my invention.

Figure 2 is a sectional view through the same.

Figure 3 is a plan view of the loader.

Figure 4 is a sectional view on the line 4—4 of Figure 1.

Figure 5 is a detail perspective view of one of the loading members.

Figure 6 is a perspective view of one of the conveyor elements.

Figure 7 is a sectional view on the line 7—7 of Figure 1.

Figure 8 is an enlarged sectional view showing the means for maintaining the conveyor belt tight.

Figure 9 is an enlarged fragmentary view showing a modified construction, partly in side elevation and partly in section.

Referring now to the drawings in detail, 1 designates a frame of appropriate construction. Journaled in suitable bearings carried by the frame at the rear end thereof is a rear axle 2 and on the outer ends of the rear axle 2 are mounted ground wheels 3.

Appropriately secured to the side bar of the frame 1 adjacent to the forward end thereof are ground casters 4 that cooperate with the ground wheels 3 to support the frame 1 and connected to the front end of the frame 1 is a draw bar or coupling member 5 by means of which the loader as a unit may be attached to the wagon or other vehicle that is pulling the loader.

Upstanding from the side members of the frame 1 adjacent to the forward end thereof are vertical uprights 6 arranged in parallelism and fastened to the upper end portions of the vertical uprights 6, respectively, are side boards 7 inclined and having their rear ends resting upon the side members of the frame 1 and their forward ends extending beyond the uprights 6 and terminating in a plane substantially in line with the front end of the frame.

Extending across the space between the side boards 7 are transverse bars 8 that are fastened to the upper edges of the side boards adjacent to the top and bottom ends thereof, respectively. Fastened to these transverse bars 8 are longitudinal bars 9 that are spaced apart in parallelism. Extending across the space between the side boards 7 and adjacent to the lower edges of said boards are cross bars 10, arranged adjacent to the top and bottom ends respectively of the side boards, while secured to these cross bars 10 are longitudinal bars 11 that extend longitudinally of the side boards.

These side boards, cross bars and longitudinal bars constitute a housing or chute through which the hay is adapted to be drawn, and fastened to the upper sides of the cross bars 10 are guide bars 12 having their top and bottom ends inclined downwardly, as at 13.

Journaled in suitable bearings carried by the side bars of the frame 1 is a transverse shaft 14 and fixed to the shaft 14 adjacent to the respective ends thereof are sprocket wheels 15, while secured to the lower edges of the side boards 7 at the upper ends of said side boards by means of bolt and slot connections 16, as shown clearly in Figure 8 of the drawings, are bearing brackets 17, and journaled in these bearing brackets 17 is a shaft 18 upon which are fixed sprocket wheels 19 alining respectively with the sprocket wheels 15. Over these alining sprocket wheels are trained endless chains 20 and spanning the space between the chains 20 and appropriately fastened to such chains are conveyor elements, each comprising in the present instance a bar 21 equipped with outwardly extending inclined teeth 22 spaced apart equal distances. These conveyor elements are preferably spaced apart equal distances along the lengths of the chains, as shown in Figures 1, 2 and 3 of the drawings. In order to maintain the chains of the conveyor tight or taut I employ means that acts upon the bearing brackets 17 to slide the brackets 17 relatively to the side boards 7 upon the pin and slot connections 16. In the present instance this tension means, shown clearly in Figure 8, comprises a bracket 23 fastened to the lower edge of each side board 7 behind the corresponding bearing bracket 17; a rod 24 having one end portion slidably mounted in the bracket 23 and the other end portion secured to the bearing bracket 17. Threaded upon the last mentioned end portion of the rod 24 is an adjusting nut 25 and encircling the rod 24 between the adjusting nut 25 and the bracket 23 is an expansion spring 26. These springs act upon the nuts 25 to force the bearing brackets 17 outwardly along the lower edges of the side boards 7, thereby maintaining the chains tight. Should it be desired to take up or let out the tension of the spring 26 the nuts 25 may be manipulated.

In the rotation of the shaft 14 the sprocket wheels 15 fixed thereto impart movement to the chains 20, thereby operating the conveyor so that the upper reaches or runs of the chain will be moved over the guide bars 12, the inclined end portions of such bars facilitating the travel of the conveyor elements on the chains along the bottom of the housing formed by the side boards, cross bars and longitudinal bars. As the conveyor belt travels through the housing the contents thereof are carried upwardly and discharged through the top end of the housing and thus may drop into the wagon or other receptacle at the forward end of the loader, while the lower run or reach of the conveyor travels downwardly in order to take up a new load.

Extending across the side boards 7 adjacent to the lower ends thereof and journaled in suitable bearings carried by such side boards is a horizontal shaft 27 arranged above and slightly to the rear of the shaft 14 and fixed to the shaft 27 and spaced apart equal distances are curved tines 28 that are arranged substantially concentrically of the bottom end of the conveyor, so that as the loader travels over the ground the tines 28 will gather the hay so that the gathered hay may be taken up by the conveyor element and carried through the housing, as previously described.

These tines 28 on the shaft 27 are capable of swinging movement to active and inactive positions, and in the present instance the mechanism for so swinging the tines 27 comprises an arm 29 fixed to one end of the shaft 27 and depending therefrom, as shown in Figure 1. Connected to the lower end of the arm 29 is one end of a retractile spring 30, the other end of which is fastened to the outer surface of the adjacent side boards 7, the spring acting to hold the tines 28 normally in active position. Also connected to the lower end of the arm 29 and extending rearwardly is a rod 31, and the rear end of the rod 31 is pivotally connected with a hand lever 32 equipped with a locking dog and movable over a quadrant 33 formed with notches to receive the locking dog. By means of this lever 32 it will be seen that the shaft 27 may be oscillated to render the tines active and inactive and the tines may be held in inactive position by the dog and notches in the quadrant 33.

In order that the hay will not become congested in the tines 28 at the lower end of the conveyor I employ an agitating or delivery mechanism which, in this form of my invention, comprises a shaft 34 formed with a plurality of cranks 35 spaced apart equal distances. This crank shaft 34 is arranged transversely of the housing at the lower end thereof and the ends of the crank shaft 34 are journaled in bearings 36 carried by the upper edges of the side boards 7. Connected to the cranks 35, respectively, are agitating elements each comprising a bar 37 having one end provided with a bearing 38 as shown in Figure 5 of the drawings, to receive the corresponding crank 35 and the other end equipped with tines 39 extending rearwardly and downwardly. These bars 37 are arranged longitudinally of the housing, are spaced apart equal distances and, at their central portions, rest respectively between guide prongs 40 carried by a rod 41 that extends across the housing behind the crank shaft, which crank shaft is secured at its ends to the side boards of the housing.

The tines 39 extend into the spaces between the tines 28, as clearly shown in Figures 2 and 3 of the drawings, and in the operation of the crank shaft an oscillatory motion is imparted to the bars 37, so that the tines 39 will enter the spaces between the tines 28 and agitate the hay gathered by the tines 28, with the result that such hay will be delivered to the conveyor.

In order to drive the shafts 14 and 34 any suitable drive mechanism may be employed. In the present instance the corresponding ends of the shafts 14 and 34 at one side of the loader are equipped with sprocket wheels 42 and 43, respectively, while the corresponding end portion of the axle 2 is equipped with a sprocket wheel 44 and over these sprocket wheels is trained an endless chain 45 by which motion is imparted from the rear axle to the shafts 14 and 34, as clearly shown in Figures 1 and 3 of the drawings.

In the modified construction shown in Figure 9 I have shown another means for guiding the agitating elements, and in this form each bar 37 rests upon a roller 46 carried by the shaft 41, and surrounding the shaft 41 are coils 47 formed with outwardly extending arms 48 arranged upon the respective sides of the bar 37. The outer ends of the arms 48 carry rollers 49 that bear upon the upper edge of the bar 37, as clearly illustrated in Figure 9 of the drawings.

From the foregoing description, taken in connection with the accompanying drawings, the construction and mode of operation of my improved hay loader will be readily apparent, and it will be seen that I have provided a hay loader wherein all of the parts are so arranged and corelated as to be readily accessible so that they may be easily repaired and replaced.

While I have herein shown and described one preferred form of my invention by way of illustration, I wish it to be understood that I do not limit or confine myself to the precise details of construction herein shown and described, as modifications and variations may be made within the scope of the claim and without departing from the spirit of my invention.

Having thus described the invention, what is claimed as new, is:—

In a hay loader, a wheeled frame including a rear axle and ground wheels thereon, a conveyor housing on said frame extending upwardly therefrom at an angle thereto and having its rear end connected to the frame and its forward end arranged above the frame, said housing comprising side boards and cross bars connecting said side boards, a conveyor comprising sprocket wheels arranged at the top and bottom ends of said housing, respectively, endless chains trained over said sprocket wheels, conveyor elements arranged transversely of said chains and secured thereto and spaced apart equal distances and adapted when on the upper run of the chains to enter the housing and on the lower run of the chains to leave the housing, ground engaging tines at the lower end of said housing designed to gather the hay and deliver the same to said conveyor, agitating elements arranged between said tines at the lower end of said conveyor and designed to agitate the hay in the tines to facilitate the delivery thereof to said conveyor, a crank shaft connected to said agitator elements for oscillating the latter to agitate the hay, means for driving said conveyor and said crank shaft, said means including sprocket wheels on said axle, said crank shaft and one of the conveyor shafts and an endless chain trained over all of said sprocket wheels.

In testimony whereof, I affix my signature.

HENRY J. FERSDAHL.